Patented Aug. 15, 1933

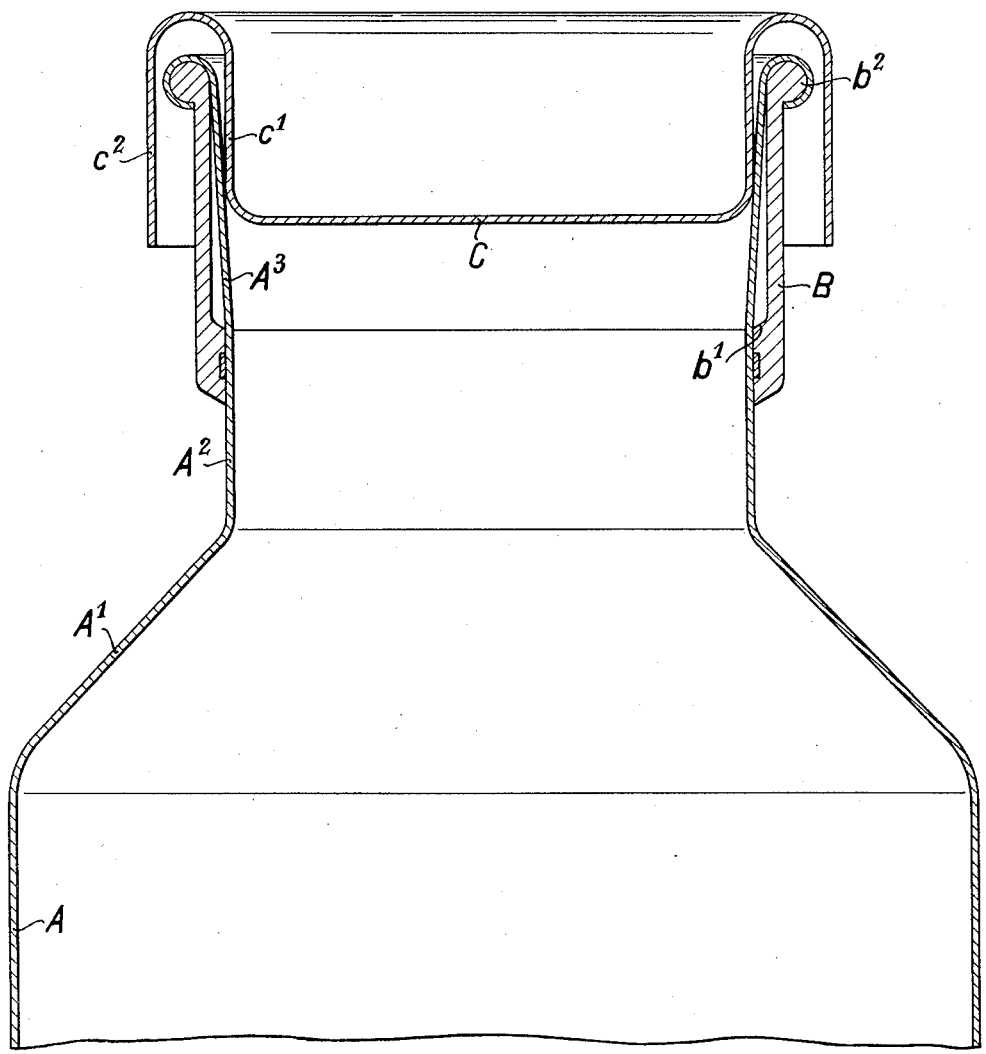

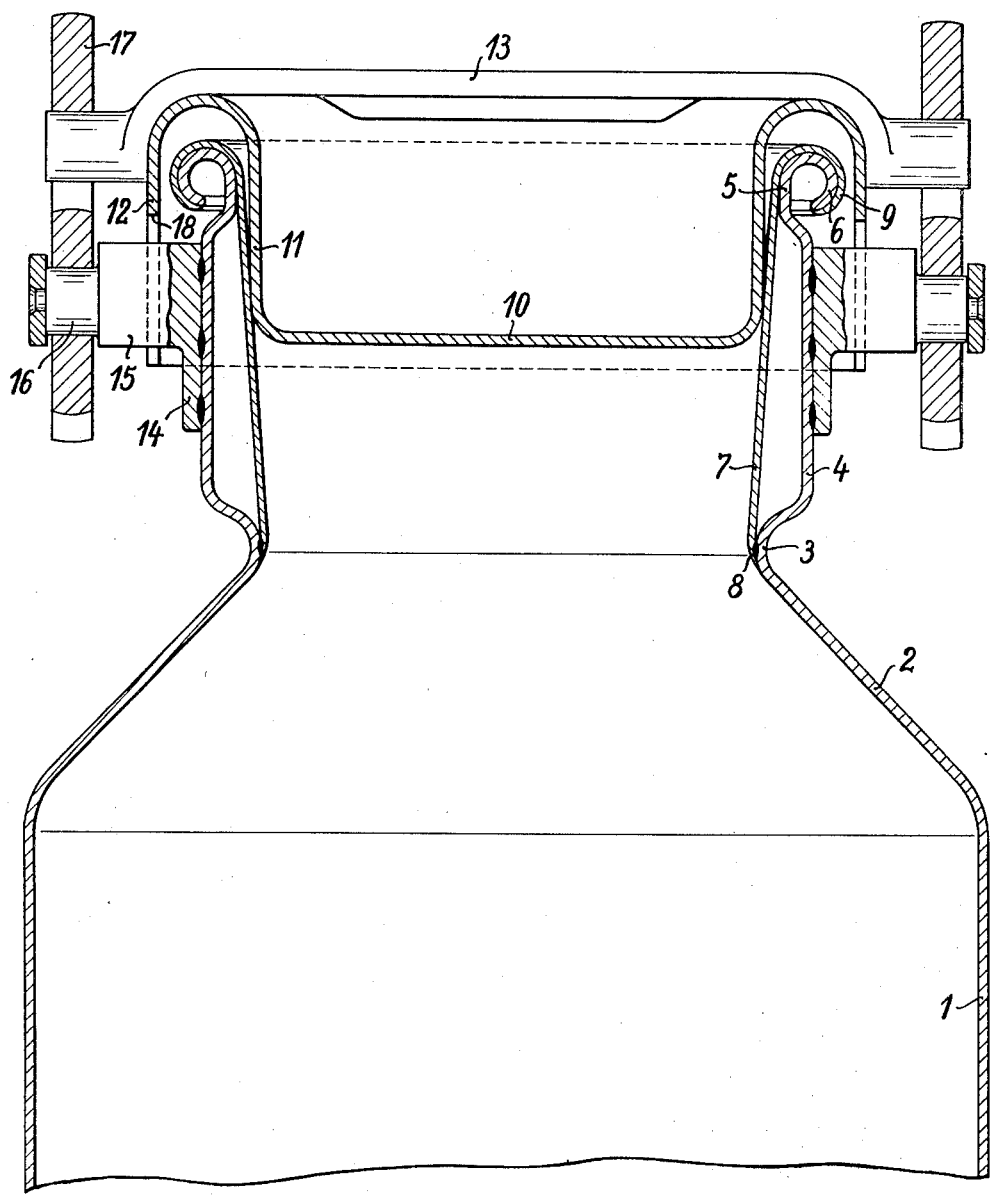

1,922,789

UNITED STATES PATENT OFFICE 1,922,789

CLOSING MEANS, MORE PARTICULARLY FOR MILK CANS AND THE LIKE

Peter Wolf, Essen, Germany, assignor to Fried. Krupp Aktiengesellschaft, Essen-on-the-Ruhr, Germany Application September 30, 1932, Serial No. 635,655, and in Germany August 5, 1931

9 Claims. (Cl. 220—42)

My invention relates to closing means more particularly for milk cans and the like in which two parts manufactured from metal come to abut against one another. My invention has for its object so to improve closures of this type, that a tight seal will be ensured even after a considerable lapse of time.

In order that my invention may be clearly understood and readily carried into effect, two embodiments of the same are illustrated by way of example in the accompanying drawings, in which Figure 1 is a vertical section of the parts under consideration of a milk can and cover, and Figure 2 is a similar section showing a modification.

Referring to Figure 1, A denotes the shell of the milk can which has a cylindrical neck part $A^2$ and an intermediate conical part $A^1$. The upper part $A^3$ of the neck $A^2$ is made conical with a small apex angle, and all these parts A, $A^1$, $A^2$ and $A^3$ have wall thicknesses of the kind usual in milk cans or receptacles; nevertheless in some circumstances the conical neck part $A^3$ may be made slightly thinner towards the top than the remainder. A cylindrical part B surrounds the neck part $A^3$ and is provided at the bottom with an internally projecting flange $b^1$ which is connected to the neck by resistance welding. At the top the part B is formed with a thickened portion $b^2$ around which the end of the neck part $A^3$ is turned. There is such a space left between the neck part $A^3$ and the part B that the neck part can bend outwards when a cover C is applied. The part B has a substantially greater wall thickness than the neck part $A^3$ and forms a protecting casing by which the surfaces of the neck against which the cover abuts are protected against damage. There is further a cross-piece (not shown) on the cover C and a locking stirrup (also not shown) on the part B by which the cover C can be pressed through this cross-piece against the can and can also be released again.

The cover consists of a downwardly dished cover part proper C, a cylindrical part $c^1$ running upwards from part C, and a downwardly directed rim $c^2$ joining on to the part $c^1$ through a suitable curved portion. The rim $c^2$ is intended to protect against damage the surfaces of the cover part $c^1$ which abut against the neck of the can. The can and the cover are manufactured from stainless steel.

In the construction described, the parts $A^3$ and $c^1$ which abut against one another and thus serve to seal the receptacle yield resiliently to one another when the cover is applied and so afford an excellent seal. This resilience is particularly attributable to the fact that the part $A^3$ of thinner wall thickness runs straight longitudinally and that this part is rigidly connected at the top and bottom to the part B of greater wall thickness. Furthermore, the neck part $A^3$ and the part $c^1$ of the cover are, respectively, protected from damage by the part B and the rim $c^2$.

The sealing part $c^1$ of the cover need not be cylindrical but may be conical, provided that its apex angle is smaller than that of the neck part $A^3$. Further contribution is made to good resilience and thus sealing by the fact that the neck part $A^3$ is comparatively long, that is to say extends deeper into the neck than the cover C when the latter is applied. The cover stays fixed after being pressed in to such an extent that the locking stirrup can be released and, nevertheless, the receptacle will remain tightly sealed.

The described construction thus forms a closure comprising two metal parts intended to come to abut against one another and of which the part C $c^1$ is comparatively rigid, whilst the surface of abutment of the other part is provided on a sheet metal part of comparatively small wall thickness which on both sides of the surface of abutment is fixed to a rigid part B and runs straight between the places where it is fixed, the rigid part B being at such a distance from the sheet metal part $A^3$ below the place of abutment of the cover C $c^1$, that the sheet metal part $A^3$ is capable of bending.

In the embodiment illustrated in Figure 2 the container again has a shell part, denoted by 1, and a conical part 2 which is connected to a cylindrical part 4 by an inwardly bent part 3. The cylindrical part 4 forms the neck of the can and has on its upper end a narrowed part 5 with an outwardly bent rim 6. The internal diameter of the narrowed neck part 5 is slightly greater than that of the lower bent part 3. The annular space existing between the parts 3 and 5 is obturated by a part 7 which on its lower end is connected to part 3 at 8 by resistance seam welding and on its top end to the rim 6 by being bent thereon at 9. In consequence of the difference in diameter of the parts 3 and 5 the part 7 runs slightly conically. After welding the lower edge of part 7 is ground in such a manner that a satisfactory smooth surface is obtained at that point. Under certain circumstances, also the upper end of part 7 may be fixed to the rim 6 by resistance seam welding.

As indicated in the drawings, suitably the wall thickness of the part 7 is somewhat smaller than that of the cover and receptacle. Like in the first embodiment a downwardly dished cover serves to close the receptacle. This cover has a bottom 10 and a cylindrical shell part 11 with a downwardly directed rim 12 joining on to the part 11 through a suitably curved portion. The cover has fixed to it a cross piece 13 while on the cylindrical neck part 4 are mounted diametrically oppositely two journals, welded by their base plates 14 to part 4. The inner part 15 of these journals is of rectangular cross section, whilst the outer part 16 is circular. These outer parts serve to fix the stirrup 17 by means of which the cover is pressed against the neck of the cam and can also be released again. In the rim 12 are provided two diametrically opposite recesses 18 corresponding in width to that of the rectangular journal portions 15. Both the can with the insert 7 and the cover consist of stainless steel.

This last-described construction of the neck affords the same advantages as the first embodiment. Moreover, in order to improve the sealing effect, the apex angle of the insert 7 is so determined relatively to the configuration of the dished cover, that the latter after having been applied abuts against the insert 7 on a circumferential surface of a certain width, that means, not only on a circumferential line. Finally, it is not essential that the shell portion 11 of the dished cover be cylindrical, it may have a conical shape.

What I claim and desire to secure by Letters Patent is:—

1. A closure of the class described comprising two metallic parts intended to abut against one another, one of these parts being rigid in the zone of abutment, while the zone of abutment of the other part is provided on a sheet metal part of comparatively small wall thickness which on both sides of the zone of abutment is fixed to a rigid part and runs straight between the places of fixation, said rigid part below the zone of abutment being arranged at a distance apart from said sheet metal part so as not to prevent bending of the latter.

2. A closure of the class described comprising two metallic parts intended to abut against one another, one of these parts being rigid in the zone of abutment, while the zone of abutment of the other part is provided on a sheet metal part of comparatively small wall thickness which has the shape of a conical shell and on both sides of the zone of abutment is fixed to a rigid part and runs straight between the places of fixation, said rigid part below the zone of abutment being arranged at a distance apart from said sheet metal part so as not to prevent bending of the latter.

3. A receptacle, a cover adapted to fit within the upper portion of said receptacle, a comparatively thin-walled conical sheet metal part in said upper portion of said receptacle adapted to come into sealing contact with said cover, a comparatively thick-walled part on said receptacle surrounding said sheet metal part and having the latter fixed on it at top and bottom, said surrounding part below the zone of abutment of said sheet metal part being spaced from the latter to allow bending of the sheet metal part in applying the cover, said thin-walled conical sheet metal part running straight between the places of fixation.

4. A receptacle and a cover therefor as specified in claim 3, in which the upper edge of said sheet metal part is bent around the receptacle part that surrounds it.

5. A receptacle and a cover therefor as specified in claim 3, in which the cover is cylindrical or conical with a smaller apex angle than that of said sheet metal part, the latter extending farther into the receptacle than said cover when applied.

6. A receptacle and a cover therefor as specified in claim 3, in which said sheet metal part extends farther into the receptacle than said cover when applied and has an apex angle so determined relatively to the shape of said cover that the latter after being pressed in stays fixed in the receptacle.

7. A receptacle and a cover therefor as specified in claim 3, in which said conical sheet metal part extends farther into the receptacle than said cover when applied, the apex angle of said sheet metal part being so determined relatively to the shape of said cover that the latter when pressed in abuts against the former on a circumferential surface of comparatively large width.

8. A receptacle and a cover therefor as specified in claim 3, in which said sheet metal part forms a separate piece which is fixed to the receptacle on inwardly projecting wall portions of the latter.

9. A receptacle and a cover therefor as specified in claim 3, in which said sheet metal part forms a separate piece which is fixed at least on its lower end to the receptacle by resistance welding on an inwardly projecting wall portion of the latter, the sheet metal part being ground off on this end so as to give a smooth inner surface.

PETER WOLF.